US008712824B1

(12) United States Patent
Julian et al.

(10) Patent No.: US 8,712,824 B1
(45) Date of Patent: Apr. 29, 2014

(54) SYSTEM AND METHOD FOR SELF SERVICE MARKETING RESEARCH

(76) Inventors: Andrew Julian, Melbourne (AU); Scott Julian, Melbourne (AU); James Robertson, Melbourne (AU); David Lin, Melbourne (AU)

( * ) Notice: Subject to any disclaimer, the term of this patent is extended or adjusted under 35 U.S.C. 154(b) by 216 days.

(21) Appl. No.: 13/106,859

(22) Filed: May 13, 2011

Related U.S. Application Data

(60) Provisional application No. 61/334,673, filed on May 14, 2010.

(51) Int. Cl.
*G06Q 30/00* (2012.01)
(52) U.S. Cl.
USPC ............... 705/7.32; 705/14.4; 705/14.44
(58) Field of Classification Search
USPC ............................................. 705/7.32
See application file for complete search history.

(56) References Cited

U.S. PATENT DOCUMENTS

| 6,189,029 | B1 | 2/2001 | Fuerst | |
|---|---|---|---|---|
| 7,269,570 | B2 * | 9/2007 | Krotki | 705/7.32 |
| 8,280,761 | B1 * | 10/2012 | Micek et al. | 705/16 |
| 2001/0049621 | A1 * | 12/2001 | Raposo | 705/10 |
| 2006/0129457 | A1 * | 6/2006 | Nyhan et al. | 705/14 |
| 2007/0107008 | A1 * | 5/2007 | Dybus | 725/9 |
| 2008/0243586 | A1 | 10/2008 | Dohring et al. | |
| 2009/0106084 | A1 * | 4/2009 | Or | 705/10 |
| 2010/0088170 | A1 * | 4/2010 | Glore, Jr. | 705/14.19 |
| 2010/0241573 | A1 * | 9/2010 | Joa et al. | 705/80 |
| 2010/0324971 | A1 * | 12/2010 | Morsberger | 705/10 |
| 2011/0239243 | A1 * | 9/2011 | Dierks et al. | 725/14 |

FOREIGN PATENT DOCUMENTS

WO    WO 2010042978 A1 *  4/2010

* cited by examiner

*Primary Examiner* — Jacob C. Coppola
(74) *Attorney, Agent, or Firm* — Zane Coleman

(57) ABSTRACT

A method and system is presented for the creation, delivery, processing, and overall management of surveys across and on sites and applications that display online and mobile content that is tracked using an audience validation system. Improvements on the functionality of an audience validation system include creating a marketplace for content and application publishers to make their audiences available for general market research surveys. In one embodiment, the system significantly reduces the overheads involved in market research for all parties concerned including publishers, the consumers of the publishers' content, and market researchers wishing to survey the consumers of the publishers' content. In one embodiment the invention affords both publishers and marketers access to self-service portals to make their audiences available and to survey them respectively. Other embodiments afford a number of optimizations that minimize survey fatigue among potential survey respondents and minimize the repetition of both surveys and individual questions being presented to individual users through the use of cached answers.

20 Claims, 5 Drawing Sheets

SYSTEM AND METHOD FOR SELF SERVICE MARKETING RESEARCH

RELATED APPLICATIONS

This application claims the benefit of priority to U.S. Provisional Application No. 61/334,673, titled "System and method for self service marketing research," filed on May 14, 2010, the contents of which are incorporated by reference herein.

TECHNICAL FIELD

The present invention relates generally to the processes and data structures required to deliver a market research tool on top of an audience verification service that may include a universal tag.

BACKGROUND

Marketers increasingly use online and mobile advertising to advertise their brands' offerings to potential customers. To manage the costs of advertising they typically seek to target their messages to subset cohorts of the total population with a perceived greater need for the product or service to be sold. Unfortunately, despite the ability to measure in increasing detail the number of impressions, views, and users who see a particular advertisement, the degree to which advertisers can target an advertisement to particular cohort is complicated by a number of factors that inhibit accurate targeting.

Publishers attempt to increase the value of their inventory by employing various techniques to identify characteristics about who actually consumes the content on the sites and sections of the sites they operate. Advertisers and marketers, aware of this, typically seek independent validation of publisher claims around audience demographics to ensure that they are true, since typically the more accurately a publisher identify their sites' audience demographics, the more they will charge advertisers to present an advertisement to that audience.

Marketers also like to test market reactions to products and offerings by polling them to learn their reactions and opinions to specific questions. This enables them to refine their product positioning, refine fine-tune their marketing messages, and select where best to place advertisements to elicit the greatest response. This is typically an expensive and time consuming undertaking.

To conduct an effective poll, marketers must first assemble a cohort of people that match the desired demographic. This is typically achieved by either assembling a group of people manually via phone calls, or semi-automatically from a larger group of people who have opted in earlier to provide a broad set of demographic information that matches the desired cohorts' characteristics. Neither method is cost effective, efficient, or timely.

Assembling a cohort of people to match a desired demographic from scratch every time a survey is to be run wastes the effort expended in running previous surveys. Selecting a cohort from an existing set of people who have opted in to answering surveys can result in cohorts that are too small, cohorts that are skewed, and burn out/opt out behaviors for individuals who fall into frequently sampled cohorts.

Furthermore there is no simple and easy method for publishers to make their content available for marketers to launch surveys. Current methods require additional modifications to either websites hosting the content or the applications, a process, which introduces additional costs and effort. This significantly reduces the number of sites that utilize surveying technology, results in those that do keeping the results to themselves due to the expenses involved, and hurts marketers since they are unable to access large numbers of sites in an integrated fashion to achieve the reach they need.

SUMMARY

In one embodiment, a computer implemented system and/or method and/or apparatus addresses or at least ameliorates one or more of the aforementioned problems of the prior art or provides organizations with a useful commercial alternative.

In one embodiment, a computer-implemented method of conducting on-demand market research of people using devices connected over networks in which the surveys used to conduct the research are launched from a common tag that is present in all content items delivered to the devices being used by the people.

In one embodiment, the method includes the case where the content items are in the form of a web page delivered to a client side display program, i.e. browser.

In another embodiment, the method includes the case where the content items are in the form of an application that resides and is executed on the device used by the user.

According to another embodiment, the method includes the ability to restrict the launch of a survey on devices owned by people who have shared demographic information that defines them to be members of a cohort of interest.

In a one embodiment, the method includes the ability to restrict the launch of a survey to one or more sets of users selected from: users visiting specific websites, users visiting specific websites that are members of specific advertising networks, and users located in specific geographies (e.g. country, market, or region).

The method may also include the ability to omit questions from a survey that have been presented to the user in a previous survey and meet certain criteria (such as but not limited to when the question was asked and whether or not the answers may be reused) and to reuse these responses in the current survey.

According to another embodiment, the method also includes the ability for the system to launch the survey on the devices of users for whom partial or no demographic information is known and to include additional questions that will complete the demographic data to determine if they are match to the desired demographic or not.

The method may also include the ability for the system to aggregate additional demographic data supplied by the user when answering one survey to enable better targeting during the launch of surveys in the future.

According to another embodiment, the system includes the ability to track how often and to what detail a user answers multiple surveys and to use this information to limit the presentation of future surveys to minimize "survey burnout" or "survey fatigue."

In one embodiment, the survey process server waits a calculated period of time before delivering a second survey to a user, wherein the calculated period of time is based at least in part on one or more selected from the group: marketer input, publisher input, and the survey process server's measurement of parameters related to one or more surveys. In one embodiment, the survey process server measures one or more parameters related to one or more surveys selected from the group: how often a specific user has been polled over a certain period; what specific questions have been asked; how long the user takes to complete a survey; the number of questions the user actually responds to; the types of questions the user responds to; how often a user just shuts down a survey request without answering anything; and other parameters related to the time of response, questions responded to and interactive parameters that can be measured in relation to one or more surveys and their responses. In another embodiment, the survey process server extends the time period between surveys or reduces the number of questions asked in order to prevent "survey burnout" or "survey fatigue." For example, the survey process server may reduce the number of questions when it measures that a user is shutting down surveys upon presentation or only partially answering them. In one embodiment, the time extended or the number of questions asked is based at least in part on one or more selected from the group: marketer input, publisher input, and the survey process server's measurement of parameters related to one or more surveys.

In another embodiment, the system includes the ability for users to opt-out from being asked to participate in additional surveys.

In another embodiment, the system includes functionality that enables advertisers and marketers to establish accounts with the system with which they can create, deliver, manage, analyze, and report the results from surveys to a cohort of users.

The method may also include the ability to define demographic information to target a subset of the total possible number of users in the system so that the cohort reported on matches a desired demographic profile.

The method may also include the ability to automatically relax the constraints defined by the supplied demographic information to include users who have partial but incomplete matches to the supplied demographic, to create a large enough cohort from which additional users will be identified as matching the supplied demographic to enable a large enough sample size to be sampled.

The method may also include the ability to assign ownership of answers to specific questions asked by an advertisers or marketer to party who originated the question.

The method may also include the ability to restrict the degree to which answers to specific questions are made available to other advertisers and marketers also using the system.

The method may also include the ability to re-ask questions to which the answers have had ownership assigned to an advertiser or marketer or for which the sharing rights have been restricted.

In one embodiment, the system includes functionality that enables publishers and advertising networks to establish an account with the system with which they can offer their inventory to advertisers and marketers who wish to create, deliver, manage, analyze, and report the results from surveys to a cohort of users that visit content containing the inventory they control.

The method may also include the ability for the publisher or advertising network to restrict the type and number of questions that maybe asked of the users visiting content they control.

The method may also include the ability for the publisher or advertising network to block access by specific advertisers and marketers to launching surveys to users visiting content controlled by the publisher or advertising network.

The method may also include the ability for the publisher or advertising network to share in the revenue generated from running surveys on content they control.

In a further embodiment, a system for operating an online service, typically in the form of a website, includes an audience validation capability over a communications network, the system comprising: a computing device coupled to be in communication with the communications network for viewing a website, and one or more servers coupled to be in communication with the communications network for providing said online service that includes multi-group conversation management capability.

DETAILED DESCRIPTION

Further features and embodiments will become apparent from the following detailed description.

The Survey Process Server, Audience Validation Server, Advertising Server Infrastructure, Web Server Infrastructure, or any combination of the aforementioned or presented herein servers, infrastructures, databases, portals, panels, web pages or other elements can be implemented in digital electronic circuitry, or in computer hardware, firmware, software, or in combinations of them. Apparatus incorporating embodiments can be implemented in a computer program product tangibly embodied in a machine-readable storage device for execution by a programmable processor; and method steps of the one or more embodiments can be performed by a programmable processor executing a program of instructions to perform functions of the embodiments by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Figure 1:
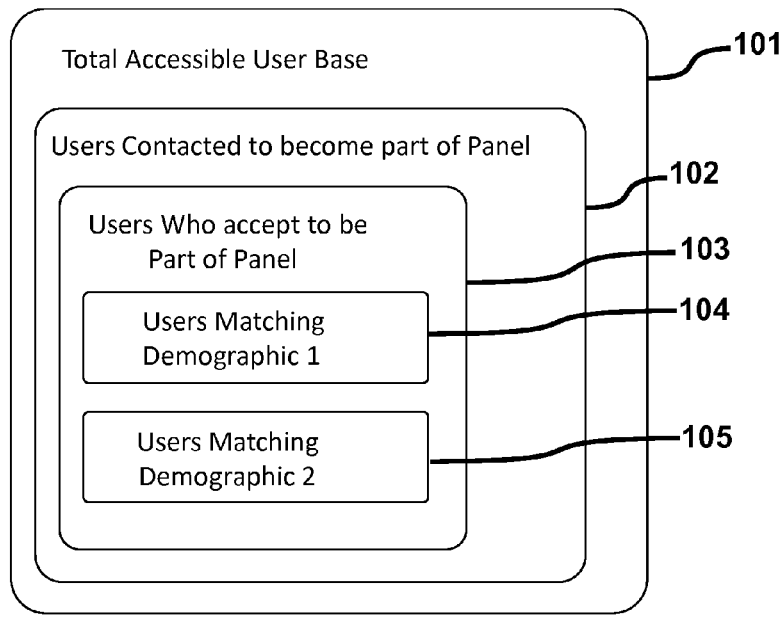
FIG. 1 is a Venn-diagram illustrating an example of the relationships between users who are selected, and accepted to make it into a Survey Panel.

FIG. 1 a Venn-diagram of one example of the relationships between users who are selected, and accepted to make it into a Survey Panel out of all possible users 101 who could be contacted to become part of a panel. Typically an organization will contact a subset of these people 102 and ask them if they would like to become part of a panel. Usually some kind of incentive or reward is provided to compensate them for the additional effort or loss of privacy required for them to participate. Of those contacted a smaller subset again will choose to become part of the panel 103. Finally for any given survey a smaller subset (104 or 105) of the panel members will match the required demographic and hence only a small number of the panel need be contacted to participate any given survey. From this description it should be clear that the construction of a Panel is an intensive process that excludes many people who could match a desired demographic.

Figure 2:
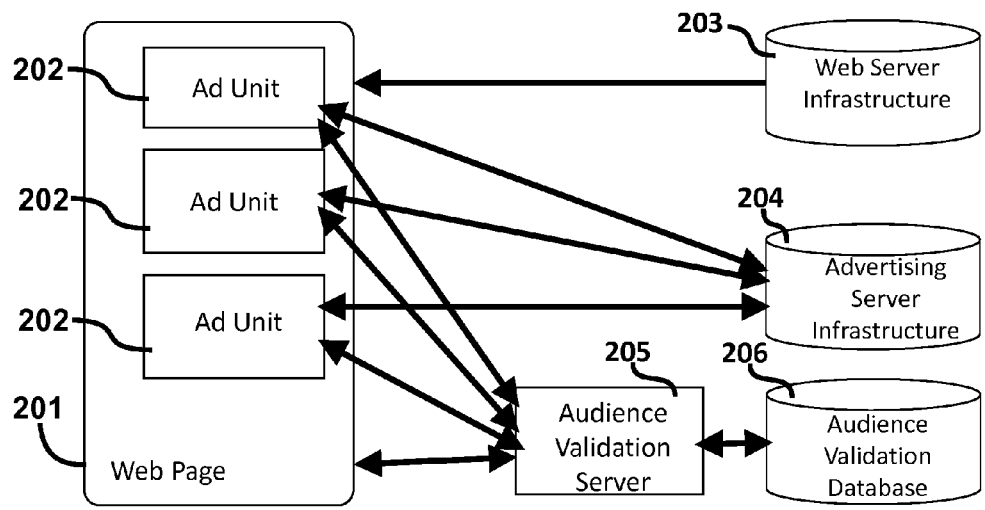
FIG. 2 is a block diagram of a simplified representation of an Audience Validation System.

FIG. 2 is a block diagram of a highly simplified representation of an embodiment of an Audience Validation system. Web pages 201 or applications (not shown) will include Ad Units 202 that contain code to retrieve an advertisement from one or more Ad Serving Infrastructure instances 204 operated by one or more entities such as advertisers, advertising networks, or advertising agencies. In one embodiment, the Audience Validation system relies on a separate previously disclosed invention that allows the web page 201 or application (not shown) and any embedded Ad Units it contains to contain a universal common tag. This universal common tag system is described in Australian Patent application number 2009201196 titled "Computer implemented website usage measuring systems, methods, and apparatus," filed Mar. 26, 2009, and the contents of which are incorporated by reference herein. When executed, this tag, typically implemented in JavaScript or some other client side scripting language, collates local data and returns it to an Audience Validation Server 205. The tag is constructed in such a way that it can access local shared objects, first-party cookies, and third party cookies, thereby enabling the regeneration of unique anonymized identifiers for a particular user in the event that any two of the three accessible data-items is deleted. The Audience Validation Server 205 integrates the calls across multiple ad units and any content calls to register a single impression of the page with a specific user who is identified using persistent data stored on the client (as disclosed in Australian Patent application number 2009201196). In this fashion the Audience Validation Server is able to create a de-duplicated and unified view of the consumption habits of individual users accessing multiple sites and content that have deployed the universal common tag. The aggregated anonymized consumption habits of users are stored in the Audience Validation Database 306 which can then provide independent verified data as to exactly how many users are visiting particular sites and viewing specific pieces of content.

As part of the processing of one or more tags from a piece of content the Audience Validation Server 305 can optionally trigger the launch of a survey on the piece of content. This survey typically contains a set of anonymized demographic questions that can be answered by the user viewing the content. Should the user respond to the questions, the answers are associated with the Unique ID that has been assigned to the user and stored in the Audience Validation Database 306.

Figure 3:
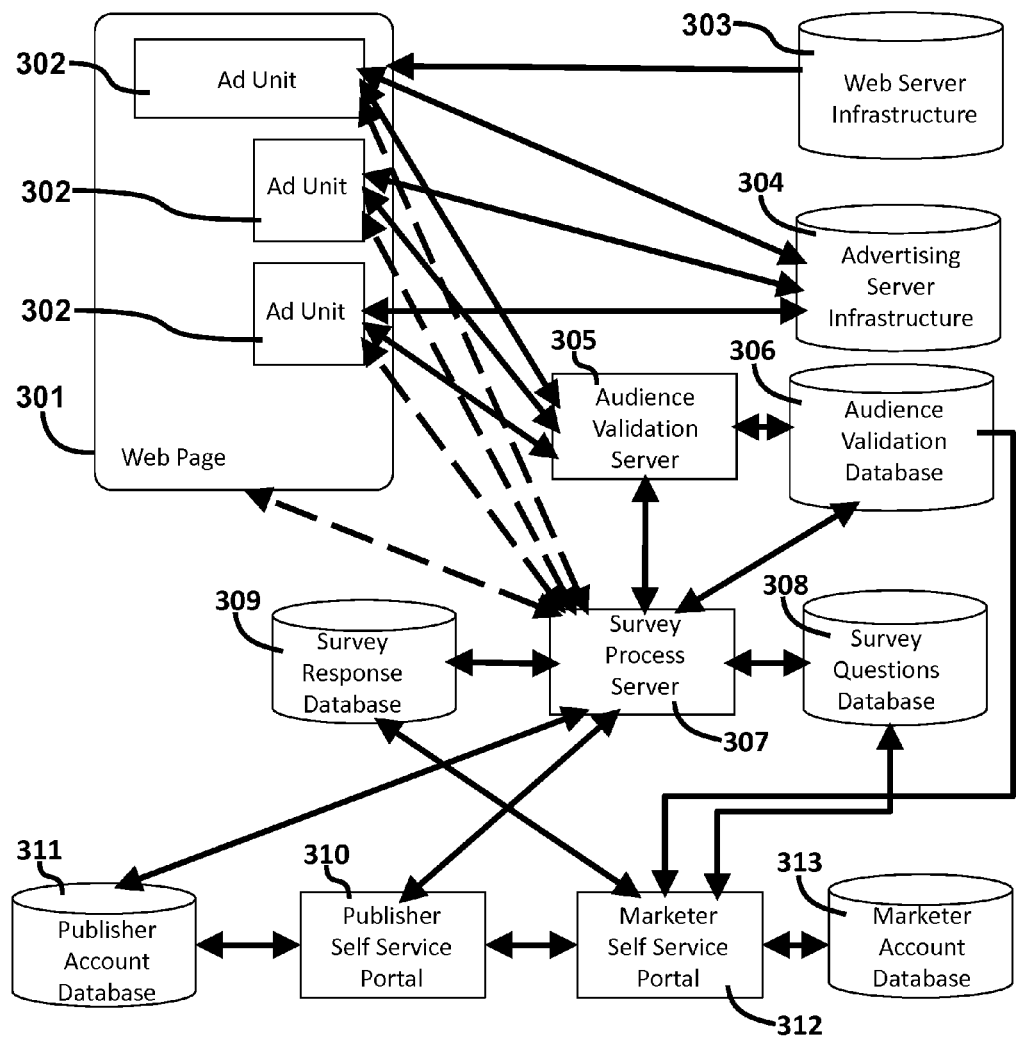
FIG. 3 is a block diagram of an embodiment of system comprising an Audience Validation System and an Insight Engine System.

FIG. 3 is a block diagram of an embodiment of system comprising an Audience Validation System and an Insight Engine System wherein the Insight Engine System incorporates additional separate functionality for delivering surveys to users in one or more embodiments. The additions are as follows.

During the step of processing the calls from the universal tags embedded in a piece of content 301 and its associated Ad Units 302, the Audience Validation Server makes an additional call to the Survey Process Server 307 to determine if a specific survey is to be delivered to the user instead of the standard demographic survey. Those skilled in the art will recognize that another embodiment is possible in which the universal tags embedded in a piece of content 301 and its associated Ad Units 302 directly contact the Survey Process Server 307 as is shown by the dashed lines in FIG. 3.

In one embodiment, the decision as to what questions are included in the survey is made by the Survey Process Server 307 and is based on one or more selected from the group of: the set of surveys and questions that could be served to the user that are stored in the Survey Questions Database 308, the response history of that user to previous surveys which are stored in the Survey Response Database 309, the users first-party cookies, third-party cookies, and Local Shared Objects, and the publisher preferences retrieved from the Publisher Account database 311. In another embodiment, other factors, including without limitation, when the user was previously surveyed, completion rates, and which specific questions have already been answered as well how recently they were answered are all taken into consideration in determining which questions to present and whether or not to present a survey at all. Those skilled in the art will realize that other factors again can also be taken into consideration.

In one embodiment, the system also provides a marketplace for Publishers and Marketers to create and deliver surveys. In one embodiment, Publishers wishing to open their inventory up for marketers will log into a Publisher Self-Service Portal 310 and designate which sites, verticals, and pages can be made accessible for marketers to launch surveys from.

In another embodiment, Publishers can also create specific exclusions that prevent the launch of surveys and specific types of questions for specific sites, verticals, and pages. In one embodiment, Publisher related information is stored securely in the Publisher Account Database 311.

In one embodiment, Marketers wishing to survey a cohort of users corresponding to a specific demographic within the system of sites and applications served by the Audience Validation System can similarly log on to a separate self-service portal tailored to their needs 312. In one embodiment, once an account has been established on this portal marketers can create surveys for specific demographic cohorts which are then stored in the Market Account Database 313. In another embodiment, after the creation of the surveys by the Marketer, the associated metadata about the surveys will be passed to the Survey Questions Database 308 for inclusion in the active set of survey questions that can be delivered to users.

Figure 4:
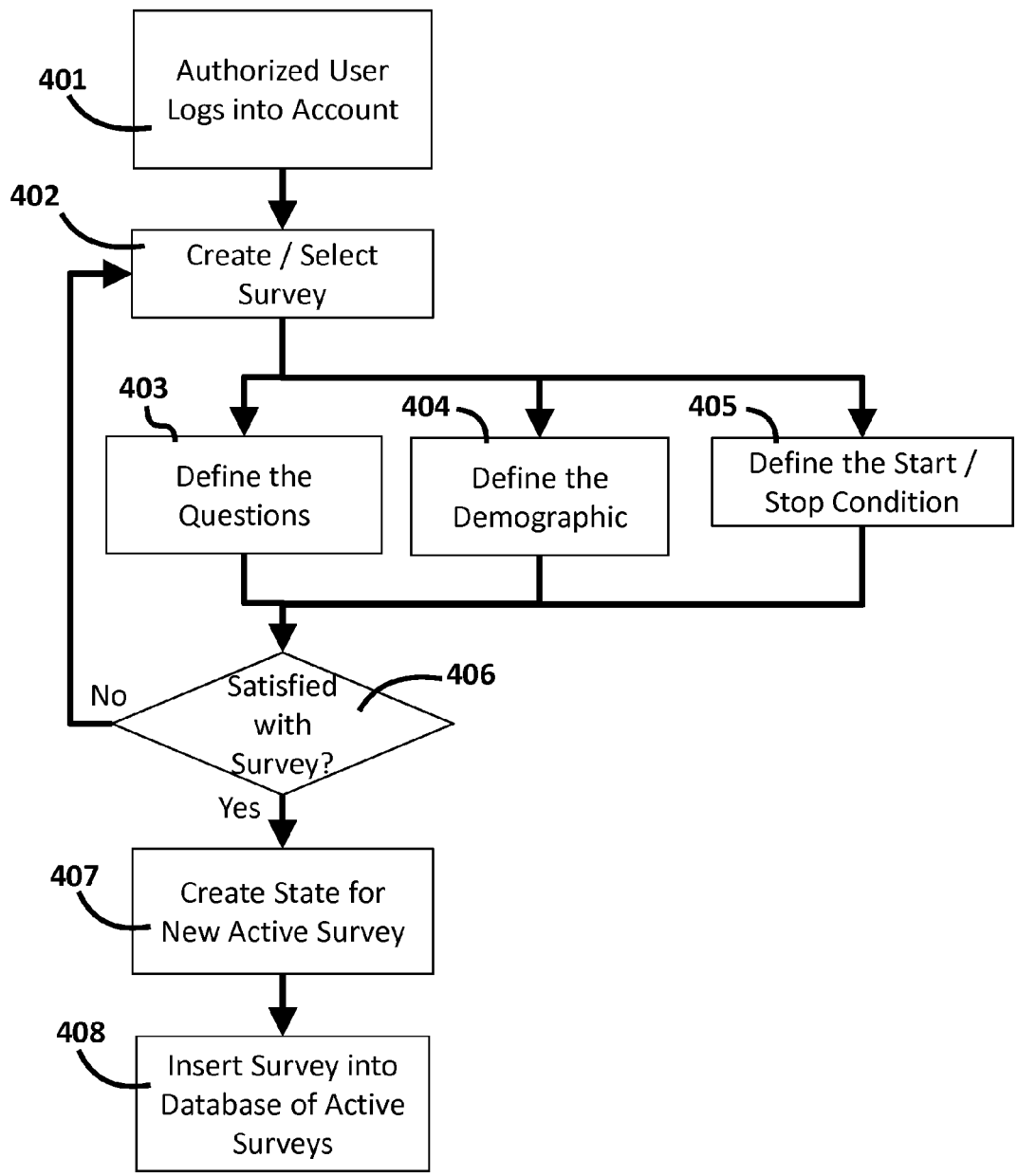
FIG. 4 is a block diagram of an embodiment of a simplified survey creation process.

FIG. 4 is block diagram of an embodiment of a simplified survey creation process for Marketers to create a survey. Step 401 shows the marketer logs into the self-service portal 312 (shown previously in FIG. 3), after which he or she can create a new or edit one or more surveys 402. The basic steps for creating a survey are: Define the Questions 403, Define the Demographic 404, and Define the Start/Stop Condition 405 of the survey.

In the Define the Questions 403 step, the questions can be chosen or defined by entering new questions and the allowed responses from which the user will be selected or created by a free form response. Selection from a list of previous asked questions is also possible.

In the Define the Demographic 404 step, the demographic will typically be defined by selecting characteristics from a number of allowable values. Examples include but are not limited to, age ranges, gender, income level, geography, site names, and category verticals.

In the Define the Start/Stop Condition 405 of the survey step, the conditions under which the survey is to be made active and deactivated are defined. These conditions may include, for example without limitation, activating or deactivating a survey at a specific date and time, activating or deactivating a survey when a specific condition relating to the user, content, or advertisement has occurred, or activating or deactivating a survey when a specific goal (number of responses for a first survey, for example) has been reached.

Once satisfied with a survey composition the marketer confirms that the survey is ready for submission 406, state is created for the survey 407 and it is then passed into the Survey Question Database 408.

Those skilled in the Art will realize that certain steps described in this process may take transposed without material effect on the operation of one or more embodiments, and in particular that steps 403, 404, and 405 may be undertaken repeatedly in any order. Accordingly, the invention is not to be considered limited to the exact ordering and steps as shown and can be considered to include any and all variations that do not affect the final outcome in terms of the establishment of a survey that can then be served by the Survey Process Server.

Figure 5:
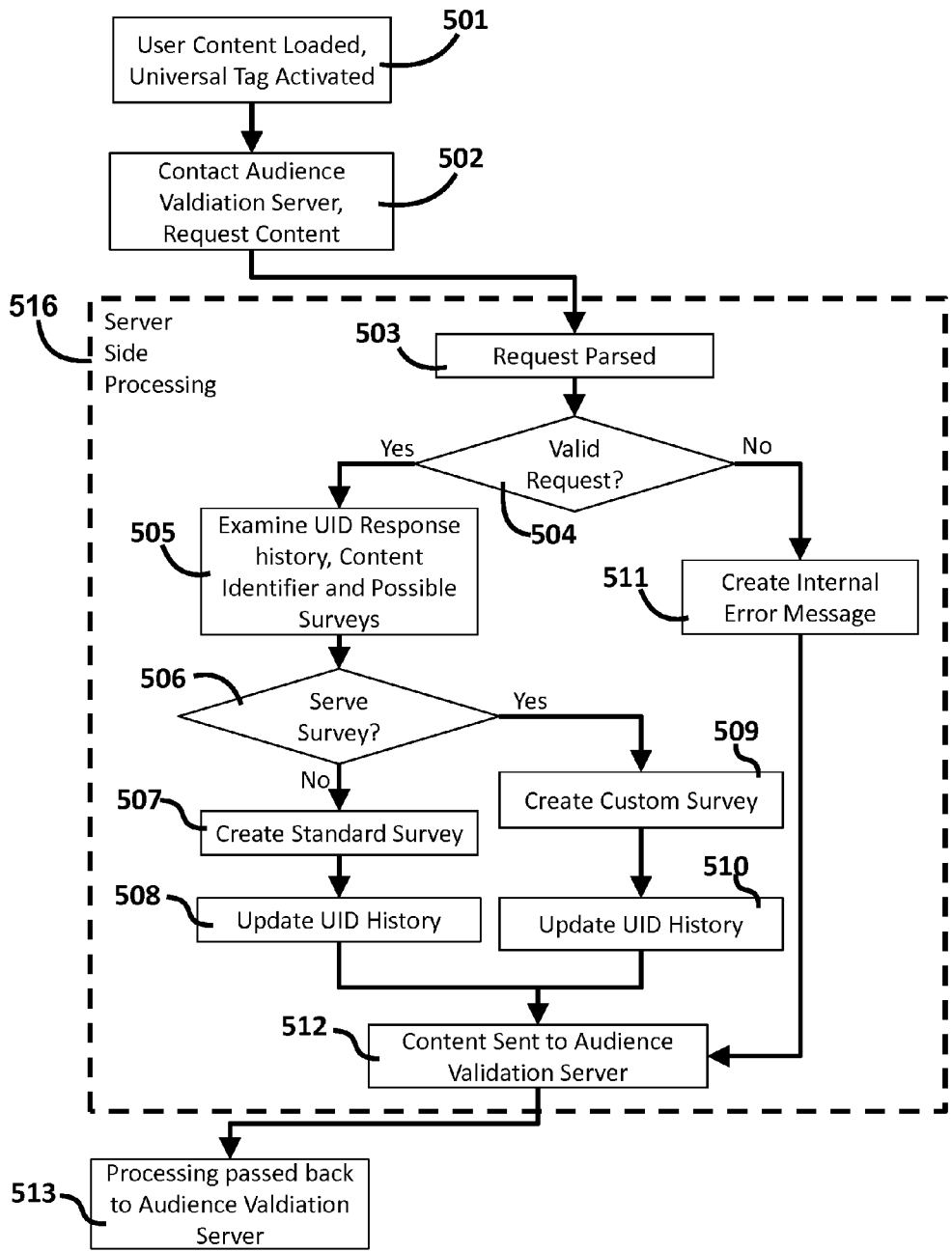
FIG. 5 is a block diagram of an embodiment of a simplified survey delivery generation and delivery process.

FIG. 5 is a block diagram of an embodiment of a simplified survey delivery generation and delivery process. Step 501 corresponds to the client side process in which a universal tag is activated by a piece of tagged content. When the code is run, the client contacts the server 502 which then executes the normal steps for audience validation during which a request is issued by the Audience Validation Server to the Survey Process Server. The simplified process used inside the Survey Process Server is shown in the Server Side Process box 516.

First the request is parsed 503 to ensure that the request is valid 504. If request is not valid, an internal error message is generated 511 that is sent 512 back to the Audience Validation Server which then continues to process the audience validations steps as if the Market Survey process did not exist. If the request is valid, the Unique Identifier (UID) associated with the user, the piece of content associated with the request, and the survey history associated with the UID are examined to determine 506 the list of possible surveys that can be served to the user associated with the UID. Note that if the user has chosen to opt-out of Audience Validation then the Survey Process Server will automatically choose not to serve a market survey to the user. In another embodiment, a refinement to this process includes directly checking with the Audience Validation Server, which would then never contact the Survey Process Server in the first place. The Survey Process Server then uses this information to determine which survey, if any, and what questions it contains should be served to the user associated with the UID.

If it is determined that a survey is to be served, then the Survey Process Server creates a custom survey 509 that either appends or replaces the questions to be asked to the standard response containing the demographics questions to be asked by the Audience Validation Server, updates the UID history 510 associated with the user to reflect that a survey has been served and which questions have been asked and sends the response back 512 to the Audience Validation Server. When the Audience Survey Server receives this response it is delivered to the user client and displayed. Finally, the processing is passed back to the Audience Validation Server 513.

If it is determined that a market survey is not to be served, then the Survey Process Server creates a standard survey 507 that contains any demographic questions that would have been asked by the Audience Survey Server, updates the UID history for the user 508 to indicate that content has been consumed but no custom survey launched, and passes the content back to the Audience Validation Server 512. When the Audience Survey Server receives this response it is delivered to the user client and displayed. Finally, the processing is passed back to the Audience Validation Server 513.

Those skilled in the Art will realize that certain steps or elements of the system described in this process or system may be transposed without material effect on the operation of the system. Furthermore, certain optimizations may also be possible depending on the exact implementation of the embodiment. For example, in one embodiment, the tags deployed by the Audience Validation Server 305 into the Ad Units 302, Web pages 301, and applications (not shown) are configured to communicate directly with the Survey Process Server 307. In this embodiment, the Survey Process Server 307 communicates directly with the Audience Validation Server 305 to ascertain what demographic data was currently associated with a user before determining what surveys and questions to serve when an Ad Unit or Web Page tag was activated. Accordingly, the invention is not to be considered limited to the exact ordering and steps as shown and can be considered to include any and all variations that do not affect the final outcome in terms of the of a survey being created for delivery by the Survey Process Server to the Audience Validation Server.

Figure 6:
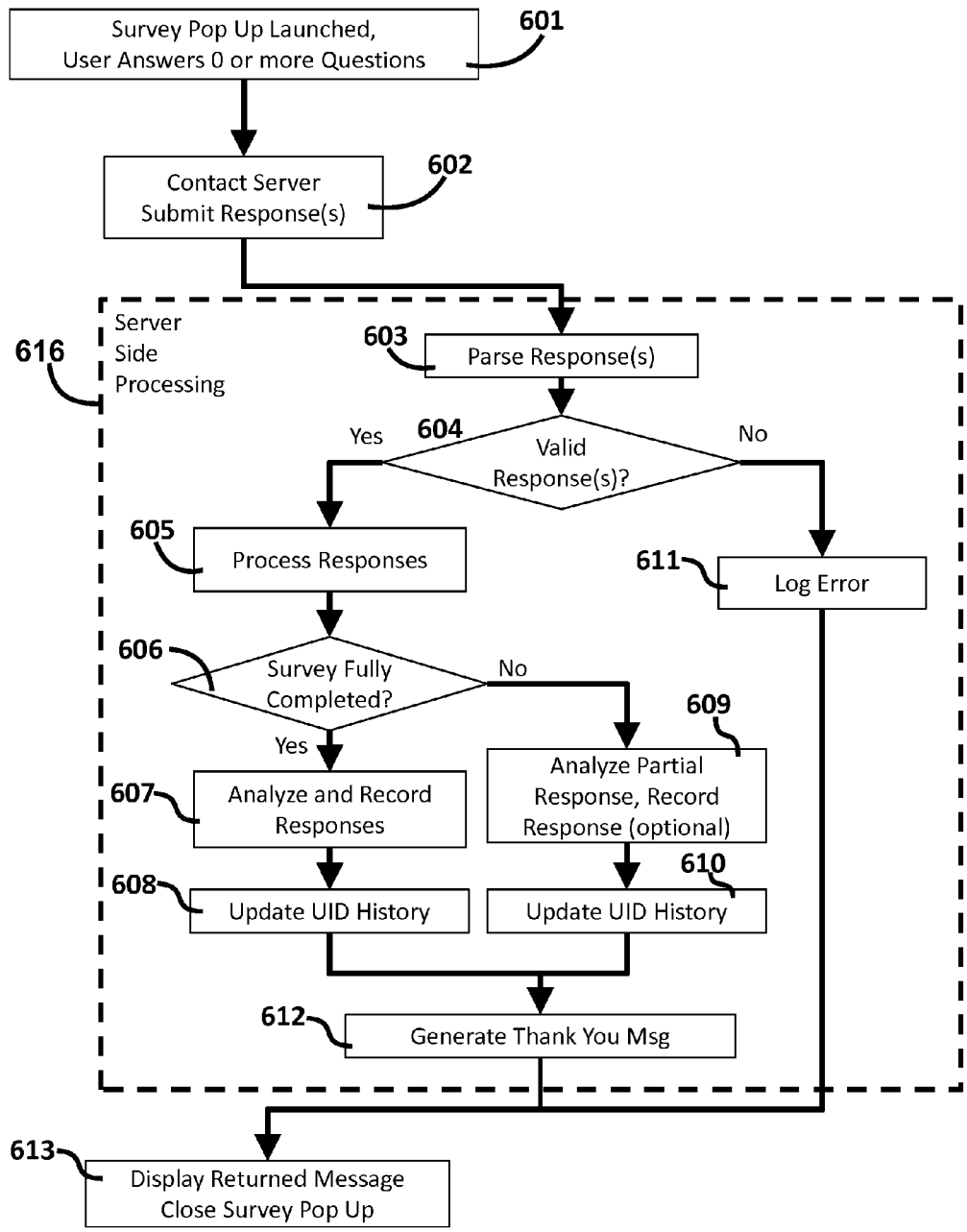
FIG. 6 is a block diagram of an embodiment of a simplified survey response process.

FIG. 6 is a block diagram of an embodiment of a simplified survey response process. After the Survey Process Server returns a modified survey to a client (as shown in FIG. 5), the client renders the Market Survey, typically as an in-window or in-application popup graphically styled to match the underlying content. The user then can answer, some, all or none of the questions asked 601 with any responses collected being submitted 602 to the Survey Process Server which then processes the responses 616. In another embodiment, the Client can optionally interrogate the Local Shared Object created by the Audience Validation Server to obtain locally cached responses to specific questions that have been asked in previous surveys. The client may include optional additional steps to check that the survey has been properly completed (e.g. all questions answered, no contradictory answers supplied, answers properly formatted) and/or to record additional environmental information about the user answering the question such as but not limited to the location of the user, referral site, time of day, device capabilities upon which the survey was taken.

The Survey Process Server parses the response 603 and performs checks as necessary to ensure that it is valid 604. If the response is invalid then and error is logged 611. Possible causes for an invalid response could include, without limitation, an unknown user (invalid UID), expired or closed survey (user answered after popup was visible for a long time during which the survey closed), or as a result of spoofing by an attacker trying to corrupt the survey process.

Assuming that the response is valid, each valid answer is logged by the Survey Process Server in the Survey Response Database. The Server Process Server analyzes the response in terms of how long the user took to answer each questions and which answers were provided (607, 609). In the case where only a partial response was received the analysis may include additional sub-steps to adjust how often the particular user associated with UID is surveyed and on what topics questions are asked. The Server Process Server may record or discard partial responses depending on how the survey was set up by the marketer. The system may further analyze multiple responses to ascertain where users choose to opt and to pass this information on to the survey author who may then make alterations to the number and content of survey questions asked.

After analysis has been completed, the history associated with the UID will be updated (608, 610) to reflect any changes resulting from the analysis of the response to maximize the likelihood of the user associated with the responding UID successfully completing future surveys. The Survey Process Server may optionally send a thank you message 612 that can potentially contain a promotional message, back to the Audience Validation Server. The Audience Validation Server can then display the message and close the pop-up window from which the survey was taken 613.

Those skilled in the Art will realize that certain steps described in this process may be transposed without material effect on the operation of the invention. Accordingly, the invention is not to be considered limited to the exact ordering and steps as shown and can be considered to include any and all variations that do not affect the final outcome in terms of the of zero or more survey responses being processed by the Survey Process Server.

EQUIVALENTS

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other embodiments, advantages, and modifications are within the scope of the invention. This application is intended to cover any adaptations or variations of the specific embodiments discussed herein. Therefore, it is intended that this disclosure be limited only by the claims and the equivalents thereof.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

What is claimed is:

1. A system comprising:
   a. a content serving infrastructure that delivers content from a publisher to users of electronic devices;
   b. an advertisement serving infrastructure that places advertisements with the content;
   c. an audience validation infrastructure that measures and tracks consumption of the content and the advertisements by the users;
   d. a first self-service portal where a marketer specifies desired demographic characteristics or personal characteristics for a first subset of the users to be targeted with one or more surveys comprising one or more survey questions;
   e. a second self-service portal where the publisher registers the users and manages the access of the marketer to the users; and
   f. a survey process server that serves the one or more surveys to one or more survey panels actively created on-demand by the survey process server, the one or more survey panels comprise the first subset of users accessing the content who have been registered by the publisher and who match the desired demographic characteristics or the personal characteristics specified by the marketer, the survey process server comprises information on at least one user for whom incomplete or partially matching demographic characteristics or personal characteristics is available, wherein the survey process server determines whether or not the at least one user matches the demographic characteristics or personal characteristics specified by the marketer by serving disambiguating questions to the at least one user to determine missing demographic characteristics or personal characteristics of the at least one user.

2. The system of claim 1 wherein the marketer manages the one or more survey questions and manages responses to the one or more surveys using the first self-service portal.

3. The system of claim 2 wherein the survey process server receives common tag information for the users and determines the time or frequency for serving the one or more surveys based on the common tag information, wherein the common tag information is in a form of computer implemented program code or output from the computer implemented program code, the computer implemented program code generates a unique identifier common across all webpages or websites comprising the code or the output from the code.

4. The system of claim 1 wherein the publisher controls at least one of a frequency of the one or more surveys, a type of the one or more surveys, a location of the one or more surveys, and the one or more survey questions served to the users using the second self-service portal.

5. The system of claim 1 further comprising a payment infrastructure where the publisher receives payment for enabling access for the marketer to the users.

6. The system of claim 1 wherein the survey process server limits how often a user is asked to take a survey in order to prevent user fatigue and survey-burnout.

7. The system of claim 6 wherein the survey process server waits a calculated period of time before asking a user to take a second survey, wherein the calculated period of time is at least in part based on at least one selected from the group: publisher input, marketer input, and measurement of parameters related to the one or more surveys by the survey process server.

8. The system of claim 1 wherein the survey process server predicts the number of users in the first subset of users and suggests options for selecting broader demographic characteristics or personal characteristics for targeting surveys to a second subset of users comprising more users than the first subset of users.

9. The system of claim 1 wherein the survey process server caches the one or more survey questions or one or more responses to the one or more surveys and omits the one or more questions in a separate survey.

10. A computer-implemented method for delivering surveys comprising:
   a. serving content to users of electronic devices on a website or in an application;
   b. serving one or more advertisements to the users by an advertising server;
   c. validating the users by measuring and tracking consumption of at least one of the content and the one or more advertisements;
   d. specifying desired demographic characteristics or personal characteristics for a first subset of the users to be targeted with a survey comprising one or more survey questions by a marketer using a self-service portal for marketers;
   e. registering the users and managing access of the marketer to the users by a publisher using a self-service portal for publishers;

f. serving the survey by a survey process server to one or more survey panels actively created on-demand by the survey process server, the one or more survey panels comprise the first subset of the users accessing the content who have been registered by the publishers using the self-service portal for publishers and who match the desired demographic characteristics or personal characteristics specified by the marketer using the self-service portal for marketers, wherein the survey process server comprises information on at least one user for whom incomplete or partially matching demographic characteristics or personal characteristics is available; and g. determining, by the survey process server, whether or not the at least one user matches the demographic characteristics or personal characteristics specified by the marketer by serving disambiguating questions to the at least one user to determine missing demographic characteristics or personal characteristics of the at least one user.

11. The method of claim 10 further comprising managing the one or more survey questions and responses to the survey from the first subset of the users by the marketer using the self-service portal for marketers.

12. The method of claim 10 further comprising receiving common tag information for the users and determining the time or frequency for serving by the survey process server the survey based on the common tag information, the common tag information is in the form of computer implemented program code or output from the computer implemented program code, and the computer implemented program code generates a unique identifier common across all webpages or websites comprising the code or the output from the code.

13. The method of claim 10 further comprising controlling at least one of a frequency of the survey, a type of the survey, a location of the survey, and the one or more survey questions served to the users based on input from the publisher.

14. The method of claim 10 further comprising transferring payment to the publisher from the marketer by a payment infrastructure for enabling access for the marketer to the users.

15. A system comprising:
 a. one or more processors; and
 b. one or more memories comprising one or more sets of instructions that, when executed by the one or more processors, causes the one or more processors to perform a method, the method comprising:
 i) serving content on a website or in an application to a first subset of users of electronic devices from a user base;
 ii) serving one or more advertisements with the content to the first subset of users;
 iii) validating the first subset of users by measuring and tracking consumption of at least one of the content and the one or more advertisements;
 iv) receiving, from a marketer via a first self-service portal, desired demographic characteristic or personal characteristic selection information for a second subset of users to be targeted with one or more surveys comprising one or more survey questions, wherein the second subset of users is a subset of the first subset of users;
 v) registering the first subset of users and managing access to the first subset of users using input from a publisher via a second self-service portal; and
 vi) serving the one or more surveys to one or more survey panels actively created on demand, the one or more survey panels comprise the second subset of users who match the desired demographic characteristic or personal characteristic selection information received from the marketer, wherein the system comprises information on a third subset of users for whom incomplete or partially matching demographic characteristic or personal characteristic selection information is available, and
 vii) determining whether or not the third subset of users match the desired demographic characteristic or personal characteristic selection information received from the marketer by serving disambiguating questions to the third subset of users to determine missing demographic characteristics or personal characteristics of the third subset of users.

16. The system of claim 15 wherein the method further comprises managing the one or more survey questions and responses to the one or more surveys using the first self-service portal.

17. The system of claim 15 wherein the third subset of users comprises one or more users from the first subset of users.

18. The system of claim 15 wherein the first self-service portal and the second self-service portal are implemented using different instructions executed on different processors.

19. The system of claim 15 wherein the method further comprises limiting access to the one or more survey questions or responses to the one or more survey questions using input from the second self-service portal.

20. The system of claim 15 wherein the method further comprises serving a market survey to one or more users from the user base.

* * * * *